United States Patent
Schomann et al.

(10) Patent No.: US 7,710,496 B2
(45) Date of Patent: May 4, 2010

(54) CARRIER FOR A CIRCUIT BOARD ON WHICH A SENSOR COMPONENT IS HELD IN A DEFINED POSITION

(75) Inventors: Björn Schomann, Bad Segeberg (DE); Ralf Brachmann, Ahrensburg (DE); Friedrich Diercks, Ahrensburg (DE); Michael Schmidt, Hamburg (DE)

(73) Assignee: Basler AG, Ahrensburg (DE)

( * ) Notice: Subject to any disclaimer, the term of this patent is extended or adjusted under 35 U.S.C. 154(b) by 763 days.

(21) Appl. No.: 11/423,748

(22) Filed: Jun. 13, 2006

(65) Prior Publication Data

US 2007/0046632 A1 Mar. 1, 2007

(30) Foreign Application Priority Data

Jun. 16, 2005 (DE) .................. 10 2005 027 892
May 24, 2006 (DE) .................. 10 2006 024 466

(51) Int. Cl.
*H04N 5/225* (2006.01)
(52) U.S. Cl. ........................ 348/373; 396/535
(58) Field of Classification Search ......... 348/373–375; 396/535
See application file for complete search history.

(56) References Cited

U.S. PATENT DOCUMENTS

| | | | | |
|---|---|---|---|---|
| 4,979,075 A | * | 12/1990 | Murphy | ...................... 361/686 |
| 5,731,834 A | * | 3/1998 | Huot et al. | .................. 348/374 |
| 6,176,429 B1 | * | 1/2001 | Reddersen et al. | ..... 235/462.25 |
| 6,550,679 B2 | * | 4/2003 | Hennick et al. | ........ 348/E5.027 |
| 6,590,658 B2 | | 7/2003 | Case et al. | |
| 7,333,146 B1 | * | 2/2008 | Etoh | ......................... 348/374 |
| 7,359,002 B2 | * | 4/2008 | Cheng et al. | ................ 348/374 |
| 2001/0010562 A1 | | 8/2001 | Nakagishi et al. | |
| 2004/0085474 A1 | | 5/2004 | Trunz et al. | |
| 2004/0121503 A1 | | 6/2004 | Ferland et al. | |
| 2004/0169771 A1 | | 9/2004 | Washington et al. | |
| 2004/0252992 A1 | * | 12/2004 | Hunter | ...................... 396/535 |

OTHER PUBLICATIONS

Patent Abstracts of Japan, One page English Abstract of JP 60-115904 A, Jun. 1985.

* cited by examiner

*Primary Examiner*—Gevell Selby
(74) *Attorney, Agent, or Firm*—Howson & Howson LLP

(57) ABSTRACT

The invention relates to a carrier that holds a component in a defined position on a circuit board in a housing or housing part. In particular, the invention relates to a carrier for a sensor board on which a light-sensitive sensor is mounted. According to the invention, it is proposed that the carrier have at least one mechanical keying that interacts with a corresponding mechanical keying on the circuit board.

16 Claims, 2 Drawing Sheets

CARRIER FOR A CIRCUIT BOARD ON WHICH A SENSOR COMPONENT IS HELD IN A DEFINED POSITION

BACKGROUND OF THE INVENTION

The invention relates to a carrier that holds a component on a circuit board in a housing or a housing part in a defined position. In particular, the invention relates to a carrier for a sensor board on which a light-sensitive sensor is mounted. The sensor board is held by means of the carrier in the housing or a housing part of an electronic camera. Therefore, the following discussion predominantly focuses on a light-sensitive sensor and an electronic camera, but this should not be associated with a restriction. Finally, the invention also relates to a housing or a housing part for an electronic camera.

Electronic light-sensitive sensors must be aligned with precision relative to the optical axis of the objective in an electronic camera. Here, the electronic sensors can feature an essentially linear structure for so-called line cameras or an area structure for so-called matrix cameras. In both cases, it is necessary that the distance between the objective or an objective carrier and the light-sensitive surface of the sensor, the so-called rest measure, be maintained exactly. Particularly for the light-sensitive area of an area sensor to be used to the most complete extent possible, it is also necessary to align the sensor in a plane perpendicular to the optical axis through rotation and/or displacement. Finally, the sensor should also run exactly perpendicular to the optical axis. Consequently, for precise alignment, the sensor must be displaceable relative to the optical axis or to the corresponding reference edges of the housing or housing part of the camera holding it, not only in the direction of the three spatial axes, but it must also be held so that it can tilt about the three spatial axes.

For such movement of the sensor, complicated mechanical adjustment means must be integrated into the camera in order to be able to align the sensor exactly. Such an arrangement with mechanical adjustment means is described, for example, in JP-A-60115904. An exact positioning with the help of these mechanical aids requires some skill and an increased expense in time, which is not always possible in the scope of mass production.

Bonding represents a different possibility for precise positioning of the sensor in the housing or housing part of the camera. From EP 1 432 240 A1, it is known to bond a sensor in its exact position to a mounting body. The mounting body is held in the housing or housing part of the camera by known mechanical fixing means. Final alignment of the sensor in the position installed in the housing is not provided. Instead, it is assumed that the desired accuracy is achieved through the precise positioning of the sensor on the mounting body and its manufacturing accuracy.

From US 2001/0010562 A1 it is known to bond the light-sensitive sensor to a metal plate. The alignment of the sensor relative to the objective is realized by means of mechanical adjustment means that attach to the metallic plate.

Another problem is that frequently different sensors are to be mounted in one housing type or housing part type. Through such a modular construction, a plurality of different electronic cameras can be prepared in an economically favorable way. However, there is the problem that the different sensors usually have different dimensions, especially different overall heights, and also different shapes, which differ especially in the type of attachment. Therefore, direct mounting of the sensor or sensor board in the housing or housing part in the predetermined defined position is not possible without further means for various sensors.

SUMMARY OF THE INVENTION

Therefore, the invention is based on the task of embodying a carrier of the type named above such that a sensor board can be mounted in the predetermined position relative to the housing or housing part in a simple way. In particular, it shall be achieved that, with only one carrier, different sensor boards, which carry different sensors, fit in one housing or housing part in the same way.

The task is accomplished according to the invention in that the support has at least one mechanical keying that interacts with a corresponding mechanical keying on the circuit board. Such an arrangement has the advantage that the circuit boards carrying the sensor can be connected to the carrier in a predetermined position, so that the sensor is already subjected to a preliminary alignment in this way. Then it is only necessary to align the carrier within the housing or housing part so that the sensor assumes the desired defined final position.

According to a preferred embodiment of the invention, the carrier has at least two and preferably several mechanical keyings, which interact uniquely with the corresponding mechanical keying of different circuit boards. Here, the advantage of the invention becomes especially clear. It can be provided that the sensors are classified according to their size or shape or installation position on the circuit board, so that certain sensors are allocated to certain mechanical keyings of the circuit board. Then it is possible for the relevant sensor to have already been subjected to a preliminary alignment, corresponding at least approximately to the desired defined final position of the sensor in the housing or housing part, during the mounting into the carrier.

Above all, the mechanical keyings can compensate to the greatest possible extent for different heights of the sensors on the circuit board during the mounting on the carrier. Then the sensor surface always runs at an approximately equal spacing from the objective carrier. The carrier then only needs to be aligned slightly relative to the housing or housing part.

How the mechanical keyings are embodied is basically arbitrary. However, it is preferable that the mechanical keyings are formed by engaging projections, recesses, slots, and/or brackets. In this way, a simple and unique allocation is possible. Such projections and recesses can also be produced in a simple way.

According to one embodiment of the invention, the carrier has two opposing side elements provided with the mechanical keying, between which the circuit board is held. In particular, it is favorable that the side elements be elastic, in order to hold the circuit board in a clamped fashion. Therefore, the mounting of the circuit board can be significantly simplified, because the circuit board is already fixed by the clamping. Then the circuit board can be connected to the carrier via additional clamping means and/or latching means and/or attachment means. In this way, a compact unit is provided, in which relative movement between the sensor and carrier can no longer occur. It is obvious that now only the carrier still needs to be aligned relative to the housing or housing part. It can also be advantageous if the side elements or the keyings provided there are shaped differently, in order to achieve torsional locking for the circuit board. In this way, the position of the circuit board is defined uniquely.

It is favorable that the side elements have openings and/or slots and/or recesses in which projections, connecting pieces, and/or brackets of the circuit boards fit. The openings and the like can be produced in a simple way in the side elements of the carrier, while the projections and the like can also be easily produced as extensions of the circuit boards.

According to another embodiment of the invention, the carrier has at least two and preferably three, four, or five attachment projections, with which it is fixed in the housing or housing part. In this way, the carrier and its attachment can be aligned with only these attachment projections.

It is especially preferable that the carrier be bonded to the housing or housing part with a fixing mass. Here, it can be provided that for the mounting of the carrier, the sensor is kept aligned exactly relative to the housing or housing part with reference to the optical axis, until the fixing mass, for example, a bonding agent that can be UV cured, for example, has cured sufficiently. Such a fixing mass permits, first, an exact alignment of the carrier in the flowable state. Second, after curing, a secure hold in the desired final position is created. Due to the preliminary alignment of the sensor by means of the mechanical keyings on the carrier and the circuit board, small displacements of the carrier relative to the housing or housing part are sufficient to produce the exactly defined final position of the sensor. The bonding agent or the fixing mass can interact with the attachment projections, whereby the desired fixed hold is already achieved after the curing.

For precise alignment, the sensor can be moved with the carrier relative to the housing or housing part by means of at least one manipulator until the desired position of the sensor is reached within the tolerance limits in the housing or housing part, with the sensor or the carrier part being fixed in this position to the housing or the housing part with a fixing mass. The manipulator, which can be operated by a motor or by hand, permits exact positioning, so that the sensor is initially held in the correct position relative to the housing without being fixed to the housing. The alignment of the sensor by means of the manipulator can be precisely checked with optical measurement devices during the alignment. Controllers can be provided that enable automatic alignment with reference to the measurement results.

Then the fixing mass can be inserted without changing the position of the sensor relative to the housing. However, the fixing mass can also be inserted before the alignment in the housing or can be present on the sensor or carrier. It permits alignment before curing. The manipulator or its handle can be removed and the sensor is fixed in the housing or housing part of the camera.

The manipulator can attach to the carrier or sensor. Naturally it is also possible for the manipulator to attach to the housing. In particular, it can be provided that a manipulator attaches to the carrier or sensor and a manipulator attaches to the housing. Thus, it can be preferable that the manipulator attached to the carrier or sensor can execute rotational movements while the manipulator attached to the housing can execute translational movements. In this way, the sensor or the carrier can move relative to the housing in all six degrees of freedom.

Preferably, the manipulator permits the sensor or the carrier to move relative to the housing or the housing part in all three spatial directions. It is also preferable that the manipulator permits the sensor or the carrier part to rotate relative to the housing or housing part about all three spatial axes. Such manipulators are generally known and therefore do not require further explanation at this point.

Frequently, the camera housing is a sleeve with the holder for the objective at one end. The machined front edge frequently forms the reference edge, at which, for example, the rest measure, that is, the distance between the objective and sensor, is set. Components are usually placed in the camera housing from the rear side, which can be closed with a housing cover after assembly and which faces away from this front side.

Consequently, the carrier with the preassembled sensor can be inserted into the camera housing from the rear by means of the manipulator. The camera housing can have an inner shoulder which defines the approximate axial position of the carrier. The dimensions of the carrier are here selected so that this fits into the housing section holding the carrier while leaving at least a gap and preferably a circular gap. Therefore, the carrier can be moved nearly arbitrarily within the camera housing for aligning the sensor. In this way, processing tolerances in the preassembly of the sensor and carrier can be equalized.

The manipulator, which can be activated by hand or by motor, for example, by electric servomotors or electromagnetic, hydraulic, or pneumatic motors, can permit not only linear movement in the three spatial axes x, y, z, but also tilting about these three spatial axes of its handle and the carrier held within.

In this way, the sensor can be moved in six degrees of freedom. In each case, it is possible for the sensor to assume its exactly defined position relative to the reference edge or other reference surfaces or edges or points. The carrier is held in this position and the gaps are filled with a fixing mass. It can be provided that a curing bonding agent is inserted and the manipulator is separated from the carrier after the bonding agent cures, for example, after UV light irradiation. The sensor or the carrier supporting it is then held by the bonding agent in exact alignment in the camera housing.

According to the requirements for accuracy, it can be provided that the sensor is displaced only in the z-axis along the optical axis of the objective, that is, the distance to the objective is adjusted. If higher accuracy is needed, it can be tilted about the x-axis and/or y-axis and/or displaced in the x-direction or y-direction. Finally, it can be provided that it is also rotated about the z-axis.

The handle of the manipulator can hold the sensor or the carrier, for example, by means of negative pressure. Clamping devices can also be provided, which are sufficient for holding the sensor or the carrier fixed also when the fixing mass is inserted.

How or where the carrier is bonded to the housing or housing part with the fixing mass is basically arbitrary. However, it is especially preferable that there be receptacles in the housing or housing part that are dimensioned such that the carrier and/or the attachment projections are held with lateral and longitudinal play, with these receptacles being filled with fixing mass for holding the carrier, and thus the component, in the defined position. The fixing mass can be inserted into the receptacles before or after the alignment. Through such an arrangement, the carrier can move with its attachment projections within the receptacles filled with the fixing mass and thus can be aligned relative to the housing or housing part. In the desired position, all that is then necessary is to fix the carrier relative to the housing or housing part until the fixing mass has cured. Finally, the provision of such receptacles has the advantage that the fixing mass is inserted in a defined way into the housing and can be held until the carrier is inserted.

The gap dimension can be less than 1 to 5 mm. This guarantees that there is sufficient fixing mass between the housing or housing part and sensor or carrier to hold these parts fixed. Such a dimensioned gap also permits a secure insertion of the sensor or the carrier into the housing by means of the manipulator, and also the execution of the necessary movements and tilting during the precise alignment.

Furthermore, it is favorable that the attachment projections be provided with back-cut sections, tabs, recesses, or openings at their ends inserted into the receptacles. This achieves an especially close connection of the attachment projections to the fixing mass, and thus to the receptacles of the housing or housing part. A stable, displacement-proof attachment of the carrier and the sensor relative to the housing or housing part is thus possible.

The fixing mass can be a bonding agent and preferably a curable bonding agent, with the sensor or the carrier being bonded to the housing or housing part. Curable bonding agents are known which dry without contracting after being applied or inserted. In this way, it can be achieved that the precisely positioned carrier or the sensor is not displaced and/or tilted during the curing. Instead, the sensor or the carrier is held without stress in the housing or housing part. The bonding agent can be, for example, a bonding agent that can be cured under UV light.

Alternatively, the fixing mass can be a solder, with the sensor or the carrier being soldered to the housing or the housing part. This can be preferred, for example, if the carrier and the housing part are composed of solderable materials, especially metal. With solder, good heat transfer between the sensor or carrier and the housing part can also be achieved, whereby good cooling of the sensor can be realized.

According to a preferred embodiment of the invention, the carrier has an essentially H-shaped form, for which the two legs form the two side elements on one side of the base and have projections on the opposite side. Here, it is favorable that the base has an opening in the center region. Through such an arrangement of the carrier, it is possible for the circuit board with the sensor board to be fixed to the carrier from one side of the carrier such that the field of view of the sensor is directed toward the base. Consequently, in the assembled position, the optical axis runs through the opening in the center region of the base. The rear side of the circuit board remains freely accessible.

Furthermore, such an arrangement enables an especially easy insertion of the carrier into the housing or housing part of the camera. Frequently, the housing has an approximately cylindrical shape with the objective carrier arranged with the reference point or the reference area or plane on its front side. Assembly from this side is usually not possible. Instead, the carrier is inserted from the side facing away from the objective carrier. Now, because the attachment projections are arranged on the side facing away from the rear side of the circuit board, the carrier can be inserted in a simple way from the side facing away from the objective carrier into the sleeve-shaped housing or housing part. At this position, the housing can have corresponding receptacles into which the attachment projections extend.

In detail, the arrangement can be made so that the attachment projections are aligned parallel or essentially parallel to the insertion direction, while the receptacles are formed as bore holes or recesses running parallel to the insertion direction. These recesses are filled with the fixing mass, into which the attachment projections are then inserted. A secure hold is thus guaranteed.

It is preferable that the carrier be composed of a metal sheet. Such a metal sheet has, first, the desired mechanical strength. Second, metal is a good heat conductor, so that the operating heat of the sensor can be dissipated well via the carrier.

Furthermore, it is favorable if the carrier is produced from a metal sheet, and the side elements and/or the projections and/or the legs are formed by bent sections. The production of the metal sheet can be realized, e.g., through stamping, laser-beam cutting, water-jet cutting, milling, washing, etc., with sufficient accuracy. By bending the side elements, geometry is produced through which the circuit board is held between the side elements in a clamped fashion. The openings or slots that form the mechanical keyings in the outward bent position can also be produced in the same way through, e.g., stamping, laser cutting, washing.

The circuit board can be connected rigidly to the carrier by fixing means after being inserted. As fixing means, clamping plates and/or bonding agents or solder can be used. Then sensors, circuit boards, and carriers form one unit which can then be inserted into the housing or housing part and aligned in this position.

With such a carrier, it is possible to mount different sensors on different circuit boards in the same way in one housing or one housing part of an electronic camera. Here, the carrier on one side and the housing or housing part on the other side can always be shaped identically. All that is necessary is to assign circuit boards keying fitting the corresponding sensors, so that the desired preliminary alignment is already performed when the circuit board is mounted on the carrier of the sensor. Here, it can be provided that the circuit board can be mounted in only one installation position and especially only at one installation height on the carrier. Obviously, it is also possible for the circuit board to be mounted in several positions on the carrier.

The exact alignment of the sensor relative to the objective or objective carrier can then be performed by means of the carrier, which must fit into the housing or housing part such that it can be displaced only slightly. Here, a curable fixing mass is then sufficient to hold the carrier in the desired position and with the desired stability.

Overall, a modular construction of an electronic camera is achieved that permits different sensors to be housed in one camera housing type. The production is significantly simplified. In particular, it is possible to preassemble the sensor board, that is, the sensor and the circuit board, electrically and to connect it to the carrier. The resulting sensor module can then be produced completely outside the housing and tested, for example, for functionality. Then it is inserted into the housing or the housing part, it is aligned relative to the housing or housing part, and finally it is fixed.

BRIEF DESCRIPTION OF THE DRAWINGS

In the following, the invention is explained in more detail with reference to the schematic drawings. Shown are.

DETAILED DESCRIPTION OF THE INVENTION

Figure 1:
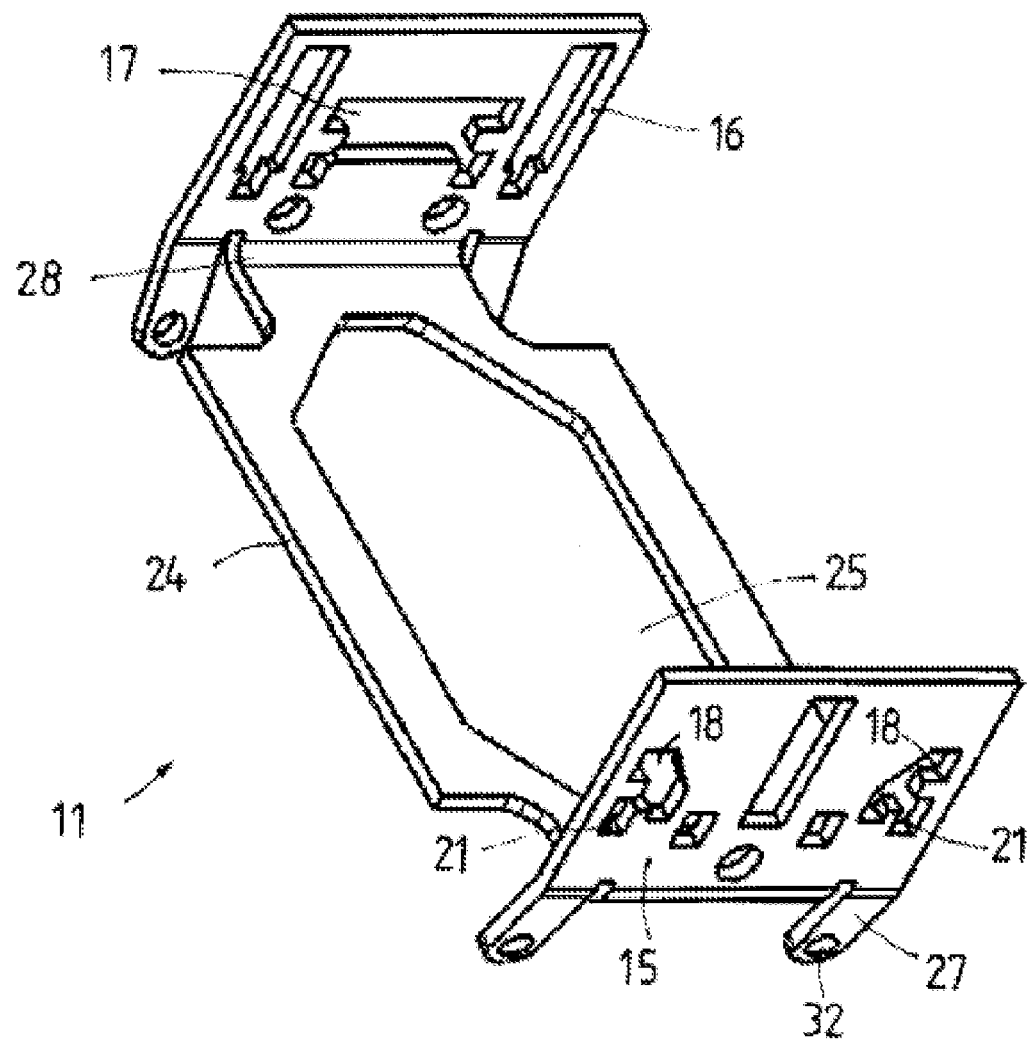
FIG. 1, a carrier in perspective view according to the invention.
Figure 2:
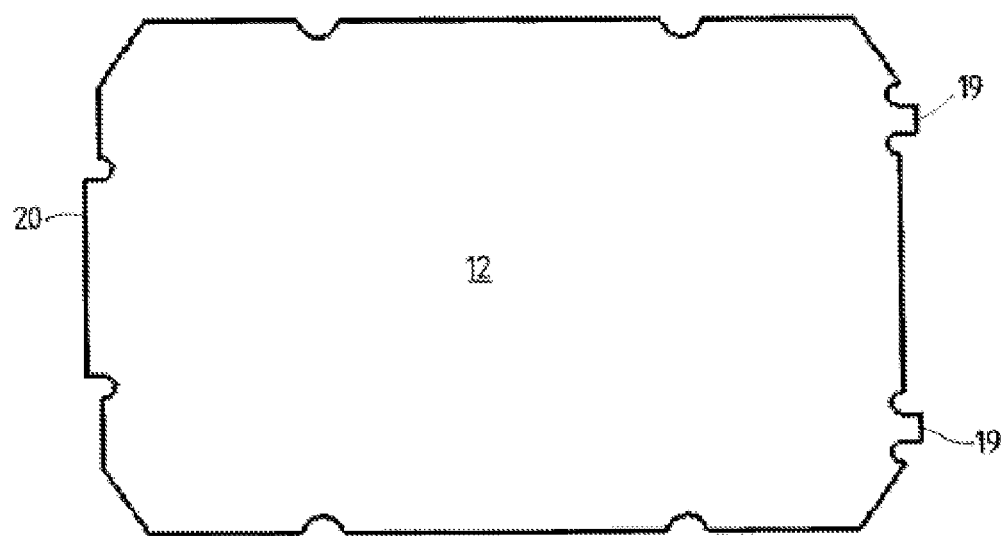
FIG. 2, the plan view of a circuit board without components.
Figure 3:
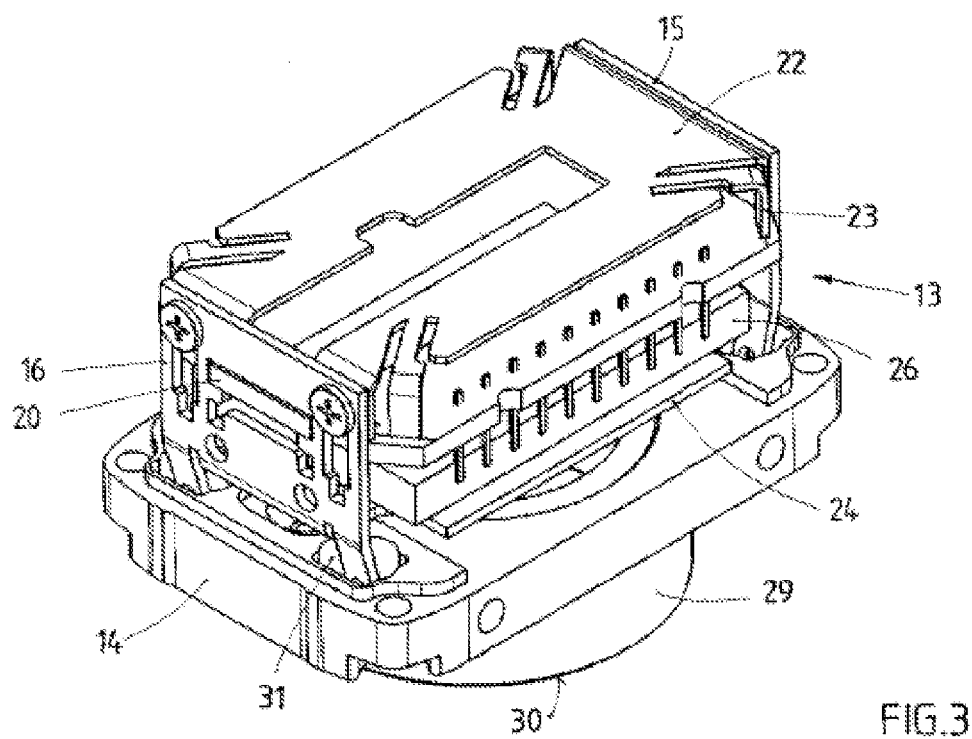
FIG. 3, in perspective view, a sensor module in assembled position.

The carrier 11 shown in the drawing for holding a circuit board 12, especially a sensor board 13, in or on a housing or housing part 14 of an electronic camera has two side elements 15, 16, between which the circuit board 12 is held. The side elements 15, 16 have a plurality of mechanical keyings formed by slots and/or recesses, for example, by a transverse slot 17 in the side element 16 and two openings 18 at one height in the side element 15. These mechanical keyings are used for holding the circuit board 12, which is provided with a corresponding mechanical keying.

In detail, the arrangement is made so that the circuit board 12 has two projections 19, which can engage in the recesses 18 of the side element 15 on the right side shown in the drawing, as the mechanical keying for the embodiment shown in the drawing. On the left side in the drawing, the circuit board 12 has a bracket 20, which fits into the slot 17 of the side element 16. It is obvious that the circuit board 12 fits into the carrier 11 only in one position, namely when the bracket 20 engages in the slot 17 and the projections 19 engage in the recesses 18.

The recesses or slots that match the side elements and belong to corresponding projections or brackets of the circuit board lie in a plane extending essentially parallel to the objective carrier or to its reference surface and thus approximately perpendicular to the optical axis of the camera in the installed position. In the correctly inserted position, the circuit board, the sensor, and thus also the light-sensitive surface of the sensor also run essentially parallel to the objective carrier or to its reference surface and thus approximately perpendicular to the optical axis of the camera.

Also if the projections 19 could engage, for example, in the recesses 21 lying underneath, the bracket 20 would then not fit in a corresponding slot in the opposite side element 16. If the circuit 12 is nevertheless inserted so that the projections 19 engage in the recesses 21 and the bracket 20 engages in the slot 17, a tilted position would be produced, which is identified immediately as an incorrect installation.

For other circuit boards, which are equipped with other sensors, especially at other heights, other mechanical keyings of the carrier can be used. The otherwise identical circuit board only needs to be provided with a corresponding keying, so that the circuit board can be inserted into the carrier only at the desired position or height in a plane running essentially parallel to the objective carrier or to its reference surface and thus approximately perpendicular to the optical axis of the camera.

The carrier 11 can be composed of an elastic material, and especially a steel sheet, with the side elements 15, 16 being formed by bending an initially flat steel sheet. The steel sheet can be produced, e.g., through stamping, laser or water beam cutting, washing, milling. In this way, it is primarily achieved that the side elements 15, 16 have certain elasticity, so that these elements can be easily bent for inserting the circuit board 12, so that the projections and brackets can lock in corresponding recesses and slots. Thus, when the side elements are released, a certain hold of the circuit board on the carrier 11 is achieved. The fixed hold is created by a mounting plate 22, which is fixed to the carrier. By means of spring legs 23, a fixed clamping of the circuit board or the completely equipped sensor board 13 is also achieved in the case of expansion due to temperature. In addition to steel sheet, other materials can be used for the carrier 11 and the mounting plate 22, among others, plastic, ceramic, cast metal, etc.

The side elements 15, 16 of the carrier are connected to each other by a center part 24, which has an opening 25 in its center region. The field of view of the sensor 26 mounted on the circuit board 12 lies in this center region 25. The opening 25 is preferably somewhat larger than the light-sensitive area of the inserted sensor. Thus, the entire field of view of the sensor is used.

Furthermore, the side elements 15, 16 have attachment projections 27, with which the carrier 11 can be fixed to the housing or housing part 14. In detail, the arrangement is made so that the attachment projections 27 are formed when the side elements 15, 16 are bent around the bending region 28, such that they are located on the side of the center part 24 facing away from the side elements 15, 16. An essentially H-shaped structure is formed, whose legs are the side elements with the attachment projections, while the center part 24 forms the base.

The housing part 14 has the objective carrier 29, to which the sensor 26 or its light-sensitive surface must be aligned exactly. The alignment concerns not only the distance to the reference plane 30 of the objective carrier 29, but also displacement in a plane parallel to the reference plane 30 and also tilting about the three spatial axes. The carrier 11 equipped with the sensor board 13 is held by means of its attachment projections 27 in corresponding receptacles 31 of the housing part 14. In detail, the arrangement is made so that the receptacles 31 are formed as bowl-shaped or pot-shaped recesses, into which the attachment projections 27 are inserted. The carrier is thus initially supported with play freely movable in the receptacles 31.

To align and fix the carrier relative to the housing part 14 or to the objective carrier 29, the receptacles 31 are filled with a fixing mass. Then the carrier 11 or the sensor 26 is aligned exactly and held in this position until the fixing mass in the receptacles is cured around the attachment projections 27. For example, a UV-curable bonding agent can be filled in. At their ends inserted into the receptacles 31, the attachment projections 27 can be provided with openings or recesses 32, into which the still flowable fixing mass penetrates and cures there while forming a back-cut. This creates an especially fixed hold of the carrier 11 on the housing part 14.

With such an arrangement it is possible to connect different sensors in the same way to an identical housing part 14. Through the mechanical keyings of the carrier 11, differently keyed circuit boards are each held in a unique position assigned only to the relevant circuit board. In particular, the mechanical keying produces a unique mounting direction of the circuit board and thus the sensor 26 on one side, and a unique mounting height of the circuit board and thus the sensor relative to the center part 24, and thus in the final position relative to the reference plane 30 of the objective carrier 29 on the other side. Thus it is possible to hold sensors with different heights with only one type of carrier in a position that corresponds approximately to the desired final position in the camera. Then, all that is still necessary is to align the equipped carrier 11 with its projections 27 in the receptacles 31. It is obvious that, for this purpose, only minimal displacements are required, which can be bridged well by the fixing mass.

A modular construction of a camera is provided, which can feature a plurality of application possibilities and especially a plurality of different types of sensors, with elements that are constructed less differently.

The invention claimed is:

1. A carrier for a circuit board on which a component is held in a defined position in a housing or housing part, comprising:
    a carrier having two opposing side elements between which one of two different keyed circuit boards is held, each of the two different keyed circuit boards being mountable in only one mounting position on the carrier with the mounting positions of the two different keyed circuit boards being different;
    each of said opposing side elements having at least two different mechanical keyings that interact uniquely with corresponding mechanical keyings of the two different keyed circuit boards such that the mechanical keying of one of the two different keyed circuit boards fits one of said at least two different mechanical keyings of said carrier and the mechanical keying of the other of the two different keyed circuit boards fits the other of said at least two different mechanical keyings of said carrier.

2. A carrier according to claim 1, wherein the mechanical keyings are formed by engaging projections and recesses or slots and brackets.

3. A carrier according to claim 1, wherein the side elements are elastic and hold the circuit board in a clamped fashion.

4. A carrier according to claim 1, wherein the side elements have openings, slots, or recesses in which projections, connecting pieces, or brackets of the circuit board fit.

5. A carrier according to claim 1, wherein the carrier has an essentially H-shaped form, for which two legs form the side elements on one side of a base and attachment projections on an opposite side of the base.

6. A carrier according to claim 5, wherein the base has a center region with an opening.

7. A carrier according to claim 6, wherein the carrier is made of a metal sheet.

8. A carrier according to claim 7, wherein the side elements and attachment projections of the carrier are produced by bent sections of the metal sheet.

9. A carrier according to claim 1, wherein the carrier is bonded to the housing or housing part with a fixing mass.

10. A carrier according to claim 1, wherein the carrier has at least two attachment projections with which the carrier is fixed to the housing or housing part.

11. A carrier according to claim 10, wherein the housing or housing part has receptacles which are dimensioned so that the attachment projections are held with lateral and longitudinal play, and wherein the receptacles are filled with fixing mass for holding the carrier, and thus the component, in the defined position.

12. A carrier according to claim 11, wherein the attachment projections are provided with back-cut sections, tabs, recesses, or openings on their ends, which are inserted into the receptacles.

13. A carrier according to claim 1, wherein the circuit board is connected to the carrier via clamping means, latching means or attachment means.

14. A housing or housing part for an electronic camera, comprising:
a light-sensitive sensor held in a defined position relative to an objective or an objective carrier,
the light-sensitive sensor being held on a circuit board and a carrier in the housing or the housing part, and
the carrier having two opposing side elements between which one of two different keyed circuit boards is held, each of the two different keyed circuit boards being mountable in only one mounting position on the carrier with the mounting positions of the two different keyed circuit boards being different;
each of said opposing side elements having at least two different mechanical keyings that interact uniquely with corresponding mechanical keyings of the two different keyed circuit boards, such that the mechanical keying of one of the two different keyed circuit boards fits one of said at least two different mechanical keyings of said carrier and the mechanical keying of the other of the two different keyed circuit boards fits the other of said at least two different mechanical keyings of said carrier.

15. A housing or housing part according to claim 14, wherein the carrier is aligned and fixed relative to the housing or housing part to hold the sensor in the defined position relative to the objective or objective carrier.

16. A carrier assembly, comprising:
a housing, a carrier, and a circuit board on which a component is held in a defined position within said housing;
said carrier having an essentially H-shaped form with two legs providing opposing side elements between which the circuit board is held within said housing on one side of a base and with two opposite legs providing attachment projections on an opposite side of the base; and
each of said opposing side elements having at least one mechanical keying that interacts with a corresponding mechanical keying of the circuit board.

* * * * *